US008732928B1

(12) United States Patent
Hinger, Jr.

(10) Patent No.: US 8,732,928 B1
(45) Date of Patent: May 27, 2014

(54) SYSTEM AND METHOD FOR REPAIRING A COUNTERBALANCE SPRING IN AN OVERHEAD ROLLING DOOR ASSEMBLY

(76) Inventor: Francis J. Hinger, Jr., Hamburg, NJ (US)

( * ) Notice: Subject to any disclaimer, the term of this patent is extended or adjusted under 35 U.S.C. 154(b) by 217 days.

(21) Appl. No.: 13/206,493

(22) Filed: Aug. 9, 2011

(51) Int. Cl.

| | |
|---|---|
| ***B23P 6/00*** | (2006.01) |
| ***B23Q 3/00*** | (2006.01) |
| ***E05F 11/00*** | (2006.01) |
| ***E05F 15/00*** | (2006.01) |

(52) U.S. Cl.
USPC ....... 29/402.08; 29/402.01; 269/17; 269/152; 280/43; 16/197; 16/198; 160/191; 49/200

(58) Field of Classification Search
USPC ................. 29/402.01, 402.03, 402.08, 898.1; 269/17, 152, 289 MR, 249, 296; 248/125.2, 129, 188.2, 353, 329, 332, 248/492, 671; 280/43; 254/134, 133 R, 2 B, 254/4 R; 16/197, 198; 160/191; 49/200
See application file for complete search history.

(56) References Cited

U.S. PATENT DOCUMENTS 3,921,761 A * 11/1975 Votroubek et al. .............. 185/39
3,979,977 A * 9/1976 Dorma ......................... 81/57.13
4,253,350 A * 3/1981 De Tarr ........................... 81/486
4,278,244 A 7/1981 Carter
4,804,162 A * 2/1989 Rice ............................. 248/671
5,544,839 A * 8/1996 Burch ........................ 242/396.6
5,605,079 A * 2/1997 Way .................................. 81/61
6,322,061 B1 * 11/2001 Maser et al. .................... 269/17
6,327,744 B1 * 12/2001 Dorma ............................ 16/197
7,780,389 B1 8/2010 Young
2011/0000626 A1 * 1/2011 Miller et al. .................... 160/89

* cited by examiner

*Primary Examiner* — David Bryant
*Assistant Examiner* — Jun Yoo
(74) *Attorney, Agent, or Firm* — LaMorte & Associates, P.C.

(57) ABSTRACT

A system and method for supporting and rotating an axle of an overhead rolling door assembly while replacing a counterbalance spring. A support stand is provided. The support stand is positioned under the overhead door assembly. The overhead door assembly is disassembled enough to expose its main axle. The support stand is adjusted in height to engage the main axle so that the support stand holds the main axle at an elevated position. The broken counterbalance spring is replaced. The main axle is the reinstalled into the overhead door assembly. A pulley wheel is then attached to the main axle. The pulley wheel is turned by winding a cable around the pulley wheel and then unwinding the cable with a winch. This rotates the main axle with the torque needed to properly pre-tension the replacement spring.

8 Claims, 2 Drawing Sheets

SYSTEM AND METHOD FOR REPAIRING A COUNTERBALANCE SPRING IN AN OVERHEAD ROLLING DOOR ASSEMBLY

BACKGROUND OF THE INVENTION

1. Field of the Invention

In general, the present invention relates to systems and methods that are used to install or repair overhead doors. More particularly, the present invention relates to systems and methods that can be used to install or repair overhead rolling doors that wind about a central axle.

2. Prior Art Description

Many businesses and some homes have overhead rolling doors. An overhead rolling door has a door typically made of interconnected metal segments. The segments are affixed to a suspended axle that is mounted over a door opening. When the door is open, the metal segments are wound around the axle in the same manner as a window shade. When the door is closed, the metal segments are unwound from the axle and are extended to the ground.

An overhead rolling door can weigh hundreds, even thousands, of pounds depending upon the size and strength of the door. For large overhead doors, the door is typically raised and lowered using an electric motor or a pulley chain. However, for smaller overhead doors, such as those used over windows and the access doors of self-storage facilities, the overhead door contains counterbalance springs. When the overhead door is pulled closed, energy is stored in the counterbalance springs. This energy acts to bias the overhead door into its retracted open position. As a result, when a person opens the overhead door, the energy stored in the counterbalance springs assists in the opening process even a small person is capable of lifting a door that may weigh hundreds of pounds.

A problem that commonly occurs in such counterbalance systems is that the counterbalance springs often need replacement due to breakage and/or metal creep. The counterbalance springs store energy for as long as the door is closed. In many scenarios, such doors can be closed for days, weeks, and even years at a time. In other scenarios, the doors may be opened and closed many times in one day, therein exposing the counterbalance springs to thousands of work cycles in a given year. Both scenarios eventually lead to the failure of the counterbalance springs.

When a counterbalance spring in an overhead rolling door assembly needs replacement, special skills and special equipment are required for the repair. In the prior art, the entire rolling door assembly is typically removed from above a door and lowered to the ground. Since the rolling door assembly may weigh many hundreds of pounds, the removal of the rolling door assembly typically requires the use of at least two men or a forklift or similar piece of heavy lifting equipment. Once the rolling door assembly is lowered to the ground, the rolling door assembly is disassembled. The damaged spring is repaired. The replacement counterbalance spring is tensioned by manually rolling the door back onto its axle. The overhead rolling door assembly is then put back together, lifted back into place and reinstalled. It will therefore be understood that the repair of a counterbalance spring in an overhead rolling door is a very time consuming and labor intensive endeavor.

In the prior art, jigs, lifts and other specialized devices used to install doors of different types are common. Consider for example, U.S. Pat. No. 7,780,389 to Young, entitled Door Installation System and U.S. Pat. No. 4,278,244 to Carter, entitled Pivotable Dolly For Holding Transporting And Hanging A Door. However, none of the prior art devices are designed to simplify the most common repair to an overhead rolling door assembly.

A need therefore exists for a system and method that enables a counterbalance spring within an overhead rolling door to be rapidly and simply repaired, so as to greatly reduce the time, labor and expense required to make such a repair. This need is met by the present invention as described and claimed below.

SUMMARY OF THE INVENTION

The present invention is a system and method for supporting and rotating an axle of an overhead rolling door assembly while replacing a counterbalance spring. If a counterbalance spring breaks and needs replacement inside an overhead door assembly, then the internal main axle of the overhead door assembly is exposed. A support stand is provided. The support stand is positioned under the overhead door assembly. The overhead door assembly is disassembled enough to expose its main axle. The support stand is adjusted in height to engage the main axle so that the support stand holds the main axle at an elevated position. A cable is provided on the support stand. The cable is hooked around the main axle while the broke springs are replaced. The cable also secures the main axle to the support stand as the main axle is removed from the overhead door assembly and reassembled into the overhead door assembly.

Once the broken counterbalance spring is replaced, the main axle is reinstalled into the overhead door assembly. A pulley wheel is then attached to the main axle. The pulley wheel is rotated by winding a cable around the pulley wheel and then unwinding the cable with a winch. This rotates the main axle with the torque needed to properly pre-tension the replacement spring. Once the replacement spring is properly pre-tensioned, the rolling door is reattached to the main axle. The pulley and the support stand are then removed. The result is that a repair job that used to take two workers a few hours to complete can now be accomplished by a single worker in less than one hour.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention repair system and method can be used to repair many types of overhead rolling doors, the embodiment illustrated shows the system being used to fix a broken counterbalance spring in one exemplary model of an overhead rolling door. This embodiment is selected in order to set forth the best mode contemplated for the invention. The illustrated embodiment, however, is merely exemplary and should not be considered a limitation when interpreting the scope of the appended claims.

Figure 1:
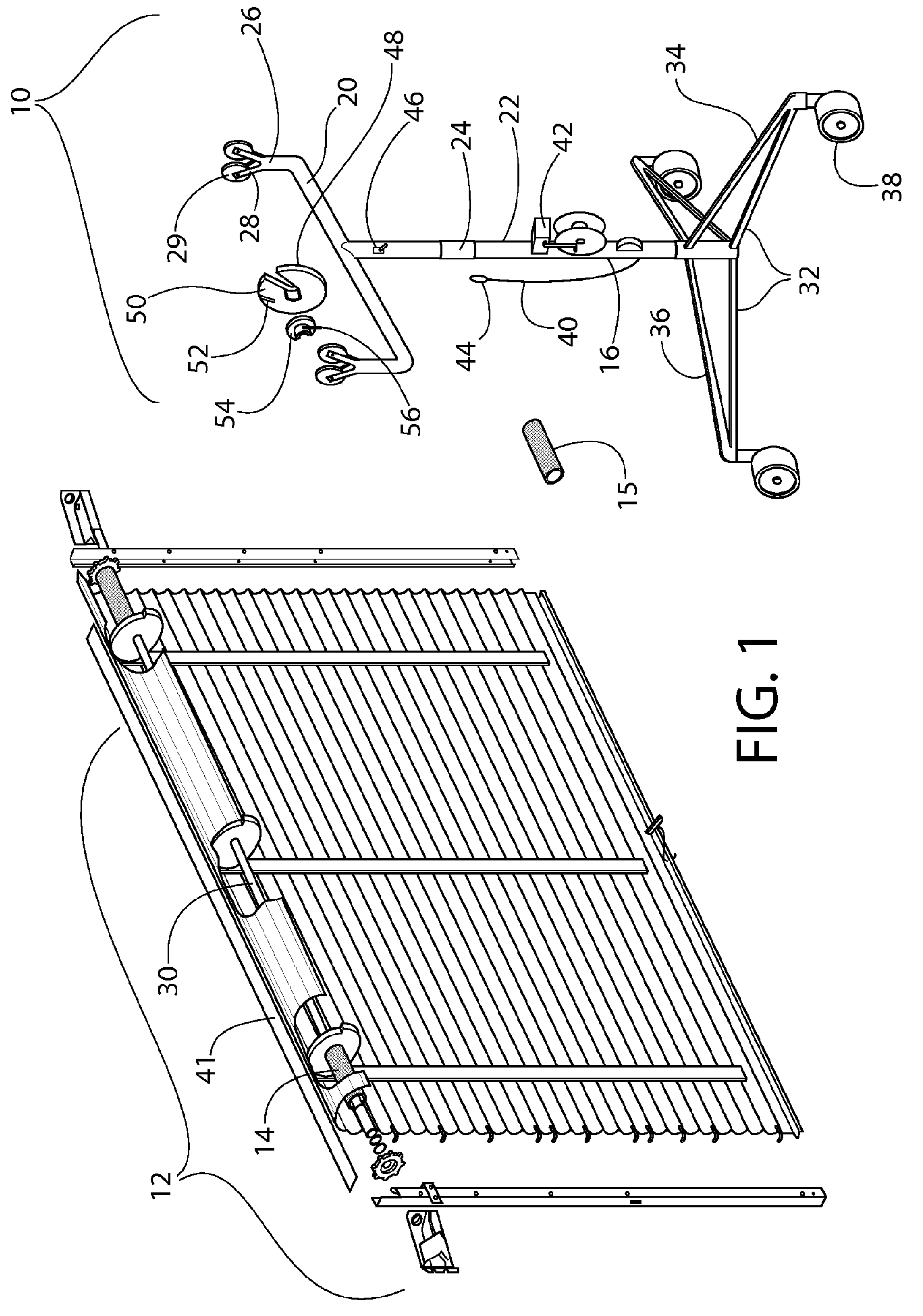
FIG. 1 is a perspective view of an exemplary embodiment of a repair system shown in conjunction with an exploded view of a prior art overhead door assembly.

Referring to FIG. 1, the present invention repair system 10 is shown in conjunction with a prior art overhead rolling door assembly 12. The overhead rolling door assembly 12 being illustrated has at least one counterbalance spring 14 that is broken or otherwise needs repair. The purpose of the repair system 10 is to make such a repair using as little time and labor as possible.

The repair system 10 includes a support stand 16. The support stand 16 has a base 18, a support head 20 and a vertical shaft 22. The vertical shaft 22 has telescoping sections and a locking mechanism 24 that enable the height of the vertical shaft 22 to be selectively adjusted by a user.

The support head 20 of the repair system 10 includes at least two yokes 26. The yokes 26 are spaced far enough apart so that the yokes 26 can support the main axle 30 of the overhead door assembly 12, as will later be explained. Each yoke 26 has two arms 28. Each of the arms 28 is terminated with a free-spinning roller 29. The free-spinning rollers 29 are spaced closely together so that the main axle 30 of the overhead door assembly 12 can rest upon the free-spinning rollers 29 during a repair.

The base 18 of the repair system 10 has a plurality of stabilizing legs 32. The legs 32 include at least one front leg 34 and a set of rear legs 36. Each of the stabilizing legs 32 is supported by a caster wheel 38. Although all the stabilizing legs 32 can be static, it is preferred that the set of rear legs 36 be pivotably connected to the base 18. This leg configuration enables the vertical shaft 22 to be rolled within eight inches of the closed rolling door 39 while still maintaining stability.

A cable 40 is provided. Although the term cable 40 is being used, it should be understood that the stated cable 40 can be any flexible tether, such as a strap, chain, rope or the like. The cable 40 is affixed to a winch 42. The winch 42 can be motor driven. However, in the preferred embodiment, the winch 42 is manually driven. The cable 40 has a free end 44 that extends from the winch 42. A hook 46 is provided on the support stand 16 for holding the axle securely to the support stand 16 during the spring replacement procedure. To secure the main axle 30 to the support stand 16, the cable 40 is simply extended over the main axle 30. The free end 44 of the cable 40 is attached to the hook 46 and the cable is tightened with the winch 42. The tightened cable secures the main axle 30 in place and prevents the main axle 30 from shifting on the support stand 16.

A pulley wheel 50 is provided. The pulley wheel 50 has a peripheral groove 48 that is sized to receive the cable 40 provided. A cable attachment 52 is formed in the pulley wheel 50 so that the free end 44 of the cable 40 can be selectively attached to the pulley wheel 50. The pulley wheel 50 also has a hub 54. The hub 54 includes a locking mechanism 56 that enables the hub 54 of the pulley wheel 50 to be locked onto the main axle 30 of the overhead rolling door assembly 12.

To utilize the repair system 10, the support stand 16 is rolled up against the closed rolling door 39 of a broken overhead rolling door assembly 12. The rolling door 39 must be closed in order to unwind the door 39 from the main axle 30. The overhead rolling door assembly 12 is removed, therein exposing the main axle 30. The rear legs 36 of the support stand 16 are spread wide so that the vertical shaft 22 can get close to the closed rolling door 39 and be positioned directly under the main axle 30 of the overhead rolling door assembly 12. Once properly positioned, the vertical shaft 22 is lengthened until the free-spinning rollers 29 press against the main axle 30 of the overhead rolling door assembly 12.

With the main axle 30 of the overhead rolling door assembly 12 being supported by the free-spinning rollers 29 on the support stand 16 of the repair system 10, the cable 40 can be extended over the main axle 30. The cable 40 is then attached to the hook 46 and tightened using the winch 42. This mechanically locks the main axle 30 into place upon the yokes 26 of the support stand 16.

With the main axle 30 of the overhead rolling door assembly 12 secured, the main axle 30 can be detached from the overhead rolling door assembly 12 in the traditional manner. Once the detachment is complete, the main axle 30 can be rolled away from the overhead door assembly 12 upon the support stand 16. At this time, the rear legs 36 of the support stand 16 can be extended to make the support stand 16 more stable. The main axle 30 is detached from an end bearing so that the broken counterbalance spring 14 can be accessed. The broken counterbalance spring 14 is unbolted and removed. A new counterbalance spring 15 is set into place and the main axle 30 is returned to its bearings. The new counterbalance spring 15 is now in place, however the counterbalance spring 15 is not pre-tensioned.

Figure 2:
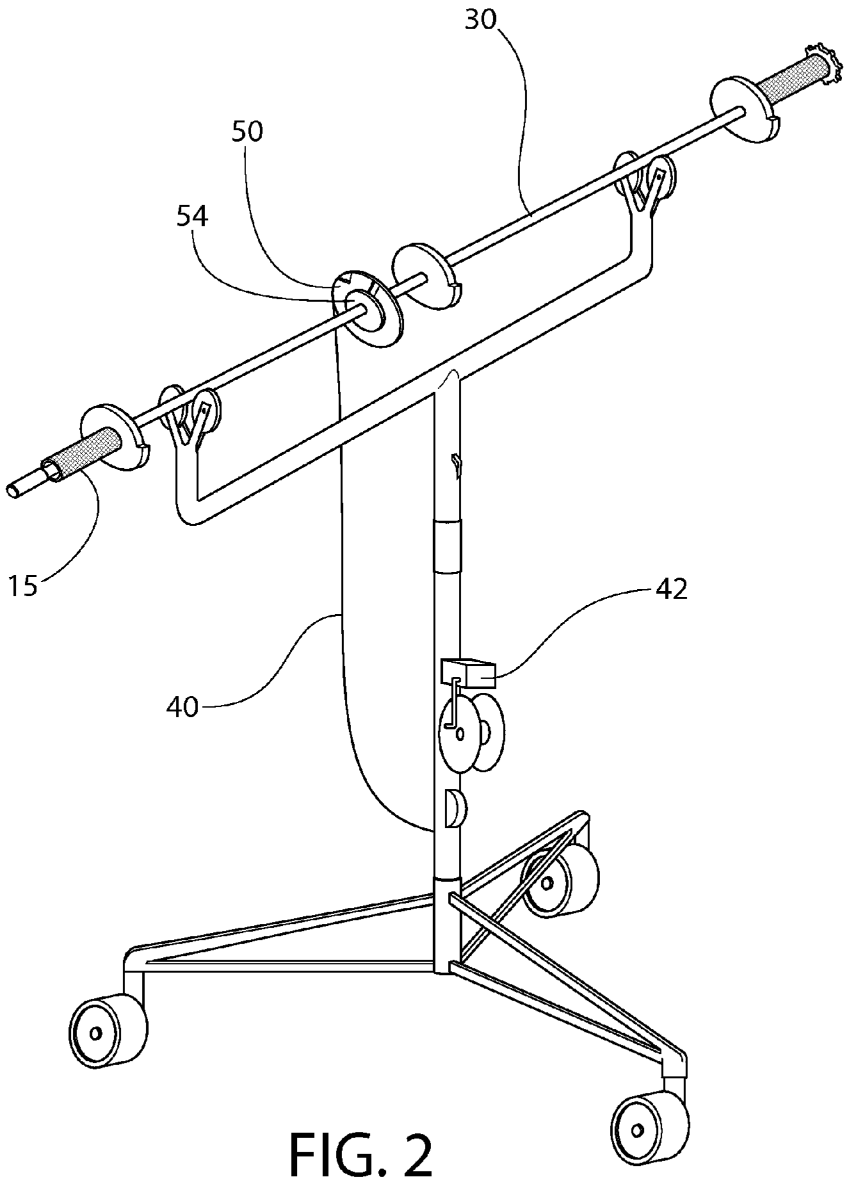
FIG. 2 is a perspective view of the repair system holding the main axle of an overhead door assembly.

Referring to FIG. 2 in conjunction with FIG. 1, it can be seen that once the broken counterbalance spring 14 is replaced with the replacement spring 15, the main axle 30 can be reinstalled into the overhead rolling door assembly 12. Once the main axle 30 is set in place, the new replacement spring 15 is pre-tensioned, prior to the rolling door being reattached to the main axle 30. To pre-tension the main axle 30, the pulley wheel 50 is passed onto the main axle 30. The cable 40 is wound on the pulley wheel 50 the number of times needed to properly pre-tension the new counterbalance spring 15. This is typically about five full rotations. The pulley wheel 50 is then locked in place on the main axle 30. Accordingly, the main axle 30 and the pulley wheel 50 must turn in tandem.

With the pulley wheel 50 in place, the winch 42 is used to retract the cable 40. As the cable 40 is retracted, the pulley wheel 50 and the main axle 30 rotate together to pre-tension the new counterbalance spring 15. Once the new counterbalance spring 15 is properly pre-tensioned, the rolling door can be reattached. The cable 40 is undone from the pulley wheel 50 and the pulley wheel 50 is removed from the main axle 30. The rolling door assembly 12 is now repaired.

By supporting the main axle 30 at a single elevation and moving it just enough to access the broken counterbalance spring 14, great economies of time and labor are achieved. The need for heavy lifting equipment is removed. Furthermore, the replacement counterbalance spring 15 can be pre-tensioned simply by rotating the main axle 30 in place. The result is that a repair job that used to take two workers a few hours to complete can now be accomplished by a single worker in less than one hour.

It will be understood that the embodiment of the present invention that is illustrated and described is merely exemplary and that a person skilled in the art can make many variations to that embodiment. For instance, the winch can be operated by an electric motor. Furthermore, an electrical adjustment can be added to the invention to automatically raise and lower the support stand. All such embodiments are intended to be included within the scope of the present invention as defined by the claims.

What is claimed is:

1. A method of supporting and rotating an axle of an overhead rolling door assembly during a counterbalance spring repair, said method comprising the steps of:

providing a support stand;

providing a winch that is anchored to said support stand, said winch having a wound tether, wherein said tether has a free end;

positioning said support stand under said axle, wherein said axle rests upon said support stand;

installing at least one counterbalance spring on said axle;

providing a pulley wheel;

attaching said pulley wheel to said axle;

extending said tether from said winch to said pulley wheel and winding said tether around said pulley wheel multiple times; and operating said winch to retract said tether and cause said tether to rotate said pulley wheel said multiple times as said tether unwinds from said pulley wheel, wherein said pulley wheel rotates said axle and pretensions said at least one counterbalance spring.

2. The method according to claim 1, further including the step of attaching said free end of said tether to said pulley wheel.

3. The method according to claim 1, wherein said step of providing a support stand further includes providing a support stand with a vertical shaft held upright by legs, wherein at least some of said legs are selectively adjustable in position relative said vertical shaft.

4. The method according to claim 1, further including the steps of:

exposing said axle of said overhead rolling door assembly;

removing said axle from said overhead rolling door assembly; and placing said axle upon said support stand, wherein said support stand holds said axle at an elevated position.

5. The method according to claim 4, further including the step of returning said axle to said overhead door assembly.

6. The method according to claim 1, wherein said step of placing said axle upon said support stand includes providing an adjustable rolling support stand, wherein said support stand is rolled under said axle and adjusted in height relative said axle.

7. The method according to claim 1, wherein said step of providing an adjustable rolling support stand includes providing a support stand with at least two sets of free spinning rollers, wherein said axle rests upon said rollers when said axle is placed upon said support stand.

8. The method according to claim 1, wherein said step of providing an adjustable rolling support stand includes providing a support stand with a vertical shaft held upright by legs, wherein at least some of said legs are selectively adjustable in position relative said vertical shaft.

* * * * *